United States Patent
Blair et al.

(10) Patent No.: US 7,308,023 B1
(45) Date of Patent: Dec. 11, 2007

(54) DUAL FUNCTION CLOCK SIGNAL SUITABLE FOR HOST CONTROL OF SYNCHRONOUS AND ASYNCHRONOUS TARGET DEVICES

(75) Inventors: James Leroy Blair, Ramona, CA (US); Timothy Eric Giorgetta, San Diego, CA (US)

(73) Assignee: Applied Micro Circuits Corporation

( * ) Notice: Subject to any disclaimer, the term of this patent is extended or adjusted under 35 U.S.C. 154(b) by 784 days.

(21) Appl. No.: 10/394,843

(22) Filed: Mar. 21, 2003

(51) Int. Cl.
*H04L 25/20* (2006.01)

(52) U.S. Cl. .................. 375/212; 375/214; 375/354; 370/270; 370/362; 370/390

(58) Field of Classification Search ............... 375/212, 375/214, 220, 354, 257; 370/257, 270, 386, 370/389, 390, 392, 355, 362, 369, 373, 384, 370/438–440, 465, 467, 509, 510, 512, 514; 709/201, 203, 220–222, 238, 239; 710/100, 710/104, 107, 110, 116, 123
See application file for complete search history.

(56) References Cited

U.S. PATENT DOCUMENTS

| | | | | |
|---|---|---|---|---|
| 5,339,395 A | * | 8/1994 | Pickett et al. | 710/305 |
| 5,434,996 A | * | 7/1995 | Bell | 713/400 |
| 5,574,726 A | * | 11/1996 | Chan et al. | 370/445 |
| 5,671,249 A | * | 9/1997 | Andersson et al. | 375/211 |
| 7,010,621 B2 | * | 3/2006 | Calkins et al. | 709/250 |

* cited by examiner

*Primary Examiner*—Dac V. Ha
(74) *Attorney, Agent, or Firm*—Terrance A. Meador; INCAPLAW

(57) ABSTRACT

A host device in a data communication system provides a dual-function clock/enable signal at a single output port shared by at least one asynchronous target device and at least one synchronous target device. In the asynchronous operating mode, the host device generates an asynchronous gated-clock signal that facilitates read/write functions of one or more selected asynchronous target devices. In the synchronous operating mode, the host device generates a synchronous clock-gate signal that facilitates read/write functions of one or more selected synchronous target devices. The target devices and the host device share both a common data bus and a common clock bus. The host device supplies the dual-function clock/enable signal on the common clock bus.

20 Claims, 4 Drawing Sheets

DUAL FUNCTION CLOCK SIGNAL SUITABLE FOR HOST CONTROL OF SYNCHRONOUS AND ASYNCHRONOUS TARGET DEVICES

FIELD OF THE INVENTION

The present invention relates generally to data communication systems. More particularly, the present invention relates to the generation and control of clock signals utilized for the transition of data between devices.

BACKGROUND OF THE INVENTION

Digital data communication systems, subsystems, and devices transfer serial and/or parallel streams of data from one location to another. In typical applications, each digital data stream is associated with a companion clock signal to which the stream is referenced. The clock signal controls read/write timing for the given data stream. The characteristics of the clock or timing signals can vary to suit the particular application and the specific devices utilized by the system.

For certain applications, a clock signal is dedicated to the particular data set and the clock signal is only active during periods of data transference. Although the timing of the clock signal is related to the timing of the data, the timing of the clock signal need not be related to the timing of any other clock utilized by the system. For example, the clock signal may be asynchronous with reference clocks used by other devices in the system. This type of clock characteristic is commonly referred to as a gapped-clock; the following description refers to this clock characteristic as an asynchronous gated-clock.

An alternative data clocking technique employs an enabling signal that facilitates data transfer relative to and synchronously with a continuously active reference clock signal. The system devices monitor this enabling signal relative to the reference clock signal and, when the enabling signal represents an active state, read or write the accompanying data (at times dictated by the reference clock signal). This enabling signal is commonly referred to as a clock enable (or data enable); the following description refers to this signal characteristic as a synchronous clock-gate.

Conventional applications, e.g., a configuration having a host device that exchanges data with a plurality of target devices, may include a mix of synchronous and asynchronous target devices. In such an application, the host device provides a separate asynchronous gated-clock signal at one output port and a separate synchronous clock-gate signal at another output port. Additional clock signals generated at additional output ports may also be required to support devices that operate at different frequencies or utilize a variety of data bus types, e.g., bit-serial or a plurality of n-bit parallel data buses. Consequently, the number of clock signal ports on the host device increases and the manner in which the various clock signals are routed to the target devices can become complicated as more distinct clock signals are added.

BRIEF SUMMARY OF THE INVENTION

A host device according to an example embodiment consolidates two clock related signal functions (e.g., an asynchronous gated-clock and a synchronous clock-gate) into one signal generated at a common output port. This feature allows the host device to control data transfer with both synchronous and asynchronous target devices. The target devices can be interconnected by a common clock bus while maintaining their respective native clocking schemes when individually prompted to perform a read or write operation. From a physical layout perspective, this feature conserves host device output pins by potentially eliminating one device pin per discrete clocking signal utilized by the target devices.

The above and other aspects of the present invention may be carried out in one form by a method for generating a clock signal by a host device that supports a plurality of target devices. The method generates, in a first operating mode, an asynchronous gated-clock signal onto a common clock bus shared by the target devices, and generates, in a second operating mode, a synchronous clock-gate signal onto the common clock bus.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, logic elements, look-up tables, and the like, which may carry out a variety of functions under the control of one or more microprocessors or other control devices. In addition, those skilled in the art will appreciate that the present invention may be practiced in conjunction with any number of data transmission applications and protocols and that the system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional techniques for clock signal generation, data transmission, data reading and writing, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

Figure 1:
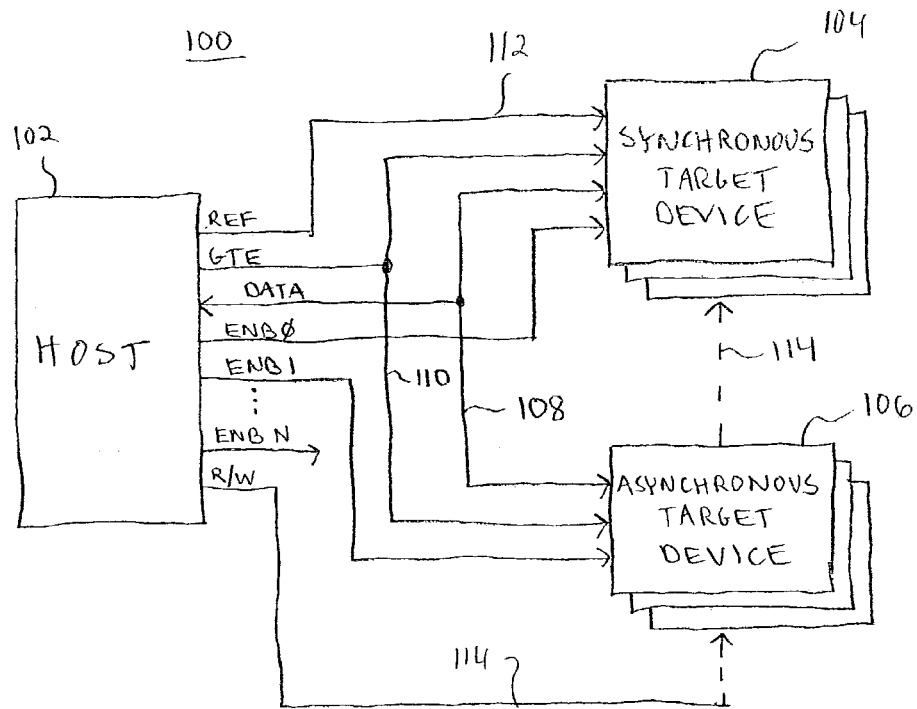
FIG. 1 is a schematic representation of an example system that employs a dual-function clock/enable feature.

FIG. 1 is a schematic representation of an example data communication system 100 that employs a dual-function clock/enable feature. System 100 generally includes a host device 102 connected to a plurality of target devices. The target devices may include one or more synchronous target devices 104 and one or more asynchronous target devices 106. As used herein, a "synchronous target device" is a device that performs data read and/or write operations in response to a reference clock signal and in response to a synchronous clock-gate signal (i.e., a data enable signal). As used herein, an "asynchronous target device" is a device that performs data read and/or write operations in response to an asynchronous gated-clock signal that need not have any timing or phase relationship with any other system clock. A given target device can be realized as a read-only unidirectional device, a write-only unidirectional device, or a read/write bidirectional device. Although not depicted in FIG. 1, a target device may also be configured to exchange data with one or more other target devices. In a practical implementation, the target devices may be configured in accordance with conventional designs. System 100 may be exemplified (absent the GTE signaling shown in FIG. 1) by the topology consistent of an embedded controller system; one in which the host is a microprocessor, the synchronous target is a filed programmable gate array ("FPGA") device, and the asynchronous target is a high level data link controller ("HDLC") device.

Host device 102 and all target devices share a common data bus 108 and a common clock bus 110. In FIG. 1, clock bus 110 is identified by the label "GTE." Host device 102, and each target device, includes a data bus input/output port corresponding to data bus 108. In this regard, each target device is connected to host device 102 via data bus 108. In a practical embodiment, data bus 108 can be realized as a data bus of width DATA [m:0] bits over which bit-serial (m=0) or word-parallel (m>0) data can be conveyed. For example, a 16-bit bus (m=15) could provide the interchange of data in 1, 4, 8, or 16 bit wide formats. Devices, for which the requisite data width is less than 'm+1' bits, would recognize only a portion of the total bus width and ignore as "don't care" the balance of the unused bus bits. Therefore, data bus 108 can represent a serial data bus or a parallel data bus; the bit width of data bus 108 may be selected to suit the particular host device 102.

Figure 2:
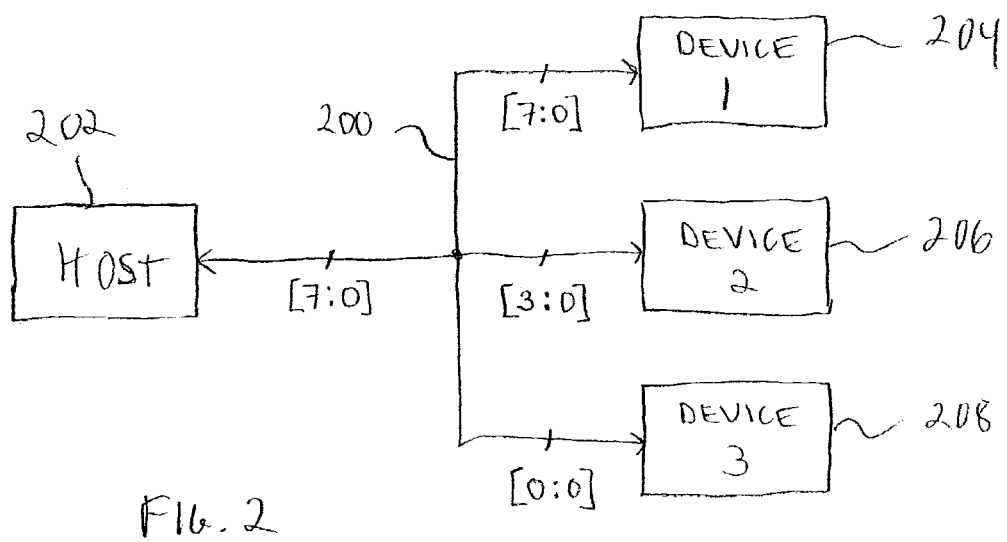
FIG. 2 is a schematic representation of an example flexible data bus architecture.

FIG. 2 is a schematic representation of an example data bus architecture 200 established between a host device 202 and three target devices (identified by reference numbers 204, 206, and 208). This example illustrates the manner in which a single data bus can accommodate data transfer with target devices having different data input configurations. In this example, data bus architecture 200 provides a parallel eight bit I/O interface at host device 202. The eight bit width is represented by the nomenclature [7:0] in FIG. 2. Target device 204 also includes an eight bit I/O interface, thus facilitating parallel 8-bit data transfer between host device 102 and target device 204. In contrast, target device 206 includes a four bit I/O interface, represented by the [3:0] nomenclature. Consequently, target device 206 need only use four of the eight bits available on the bus (in a practical embodiment, target device 206 is connected to the four least significant bits of the data bus. Target device 208 represents a serial device having a single bit I/O interface, represented by the [0:0] nomenclature. Accordingly, target device 208 need only use one of the eight bits available on the bus (in a practical embodiment, target device 208 is connected to the least significant bit of the data bus). In a practical embodiment, data bus architecture 200 can support any number of different target devices, and the data input/output capability of any given target device can be any number of bits (up to the maximum number supported by data bus architecture 200).

Host device 102, and each target device, includes a clock bus input/output port corresponding to clock bus 110. In this regard, each target device is connected to host device 102 via clock bus 110. In a practical embodiment, clock bus 110 can be realized within slow to moderate speed systems as a single-ended (single conductor) copper interconnection between host and target devices on a printed wiring assembly ("PWA"). For high speed systems, the single PWA copper interconnection would be replaced with a suitable differential (dual conductor) transmission line. In extremely high frequency applications, copper grounded differential co-planar waveguide structures would be required. Notably, a signal generated by host device 102 can be received by all target devices in system 100 via clock bus 110.

In the example embodiment, each synchronous target device 104 also receives a reference clock signal 112 from host device 102. Reference clock signal 112 ensures that all synchronous target devices 104 operate in a synchronous manner relative to each other. As described in more detail below, reference clock signal 112 controls the reading and/or writing of data by synchronous target devices 104. Reference clock signal 112 may also control any number of features or operations associated with synchronous target devices 104. In this regard, reference clock signal 112 may be continuously available at each of the synchronous target devices 104.

Host device 102 may be configured to designate whether an enabled bi-directional target device is to perform a read operation or a write operation. Accordingly, host device 102 can generate at least one read/write control signal 114 for use by the bi-directional target devices. In the example embodiment, a common read/write control signal 114 is provided to all of the bi-directional target devices, which respond to read/write control signal 114 when enabled.

To avoid conflicts on common data bus 108, host device 102 preferably reads data from only one target device at any given time. Under typical operating conditions, host device 102 writes data to only one target device at any given time. In an optional broadcast write mode, however, system 100 allows host device 102 to concurrently transfer common data to multiple target devices. Host device 102 enables/disables the target devices to facilitate the read and write operations. In this regard, host device 102 may selectively generate a number of enable signals (identified by the "ENB" label in FIG. 1) for the target devices. In accordance with the example embodiment depicted in FIG. 1, host device 102 generates one enable signal per target device— this configuration allows host device 102 to individually enable/disable each target device using one bit per target device. In an alternate embodiment (not shown), each target device receives a common multiple-bit enable signal that is decoded by the target devices to determine the enable/disable status. For example, eight target devices can be individually controlled using a three-bit enable signal. In a system that employs a broadcast feature, all addressed devices would need to respond to one or more common addresses. Therefore, in a system with an addressing depth of eight, only seven discrete target devices would be uniquely addressable and the eighth address enabling all devices to receive a host broadcast simultaneously. Host device 102 controls the state of the enable signals to activate one of the target devices (or a plurality of target devices in a broadcast write mode). In other words, host device 102 enables a single target device such that data can be transferred between host device 102 and the enabled target device; the remaining target devices are disabled.

Figure 3:
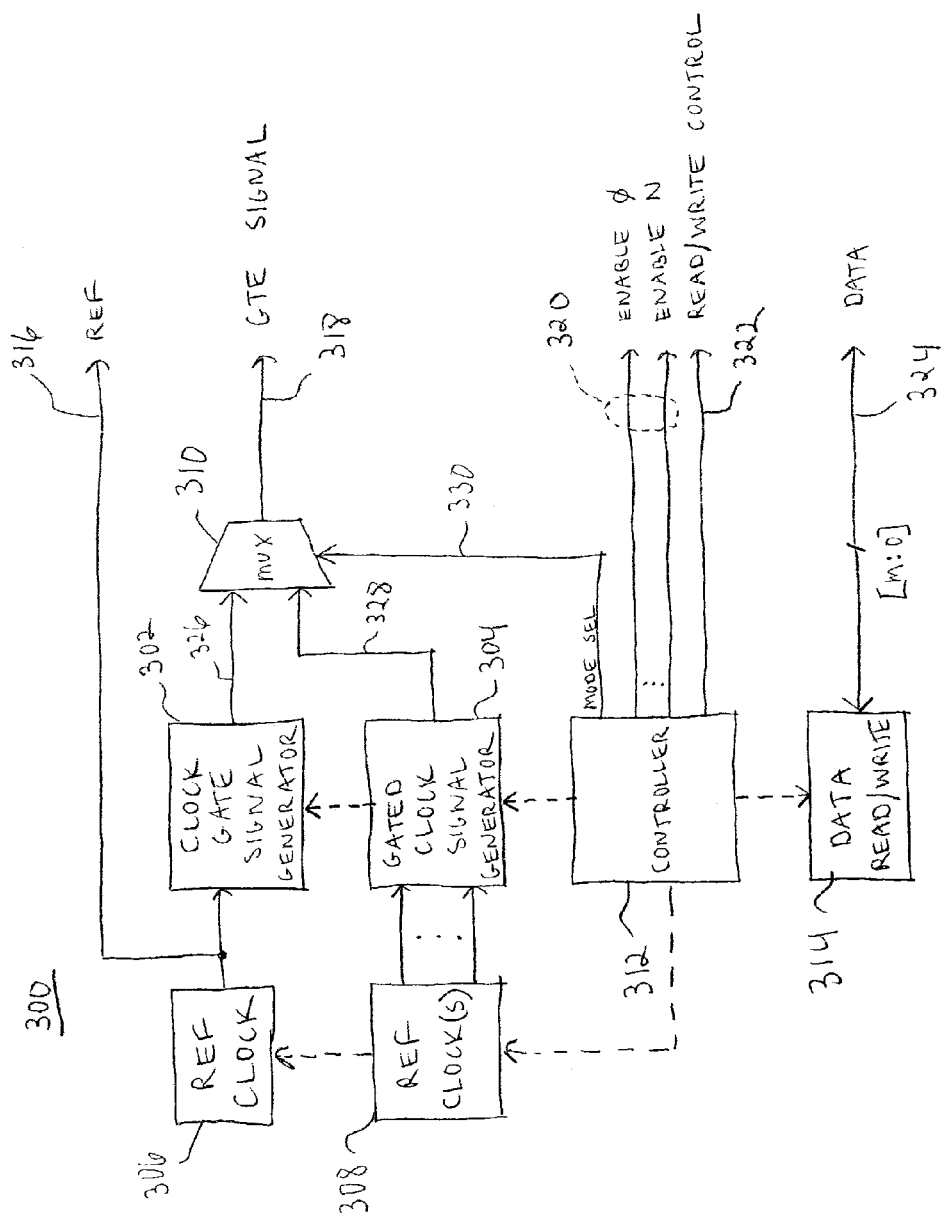
FIG. 3 is a schematic representation of an example host device that employs a dual-function clock/enable feature.

FIG. 3 is a schematic representation of an example host device 300 that employs a dual-function clock/enable feature. Host device 300 is one example configuration for host device 102 (see FIG. 1). A practical implementation of the host device may involve additional components, features, and functions not shown in FIG. 3. Host device 300 generally includes a signal generator arrangement including a clock-gate signal generator 302 and a gated-clock signal generator 304, a reference clock generator 306, one or more reference clock generators 308, a signal selection element 310, a controller 312, and a data read/write element 314. In a practical embodiment, the various components and elements of host device 300 can be realized in hardware, software, firmware, or any combination thereof. The signal generators may utilize conventional techniques to generate the respective clock and reference signals.

Host device 300 is configured to provide a common reference clock signal 316 to one or more synchronous target devices, a dual-function clock/enable signal (i.e., a "GTE" signal) 318 to a plurality of target devices, a number of enable signals 320 to a plurality of target devices, and (optionally) a common read/write control signal 322 to one or more bi-directional target devices. Host device 300 is coupled to a common data bus 324 shared by a plurality of target devices. As described above, data bus 324 may support bi-directional data transfer with some target devices and unidirectional data transfer with other target devices.

Controller 312 may be connected to the other components of host device 300 to facilitate control and operation of host device 300. Controller 312 may include or be realized as a microprocessor, a state machine, a software application, or any combination thereof. Controller 312 may access a suitable memory element (not shown) that stores target device characteristics that are considered during operation. Controller 312 is suitably configured to perform a number of functions, including, but not limited to: controlling the status of enable signals 320; controlling the status of read/write control signal 322; reading or writing data; controlling the operation of reference clocks 306/308; controlling the operation of signal generators 302/304; and controlling selection element 310.

Clock-gate signal generator 302 is configured to produce a synchronous clock-gate signal 326. The pulses of the clock-gate signal 326 occur at times specified by controller 312. The period of reference clock signal 316 influences the timing characteristics of clock-gate signal 326, i.e., clock-gate signal 326 is synchronous with reference clock signal 316. As shown in FIG. 3, reference clock generator 306 is coupled to clock-gate signal generator 302 to provide reference clock signal 316 to clock-gate signal generator 302. Gated-clock signal generator 304 is configured to produce an asynchronous gated-clock signal 328. Timing characteristics of gated-clock signal 328 are influenced by a reference clock signal provided by reference clock generator 308. Gated-clock signal generator 304 may utilize any one of a plurality of available reference clocks to perform a data transfer operation.

In a practical embodiment, selection element 310 is realized as a multiplexer coupled at the input side to signal generators 302/304 and coupled at the output side to the common clock bus output of host device 300. Controller 312 generates a mode select signal 330 that determines whether the output GTE signal 318 represents clock-gate signal 326 or gated-clock signal 328. In other words, controller 312 governs the selection of either a synchronous clock-gate signal or an asynchronous gated-clock signal for provision at the common clock bus output. As described in more detail below, the characteristics of GTE signal 318 at any given time will be dictated by a number of conditions, including, but not limited to: whether the currently enabled target device is an asynchronous device or a synchronous device; the amount of data to be transferred; the interface type (serial or parallel); and the period of reference clock signal 316 (in the case of a synchronous target device) and those of the reference clock sources 308 (in the case of asynchronous target devices).

Figure 4:
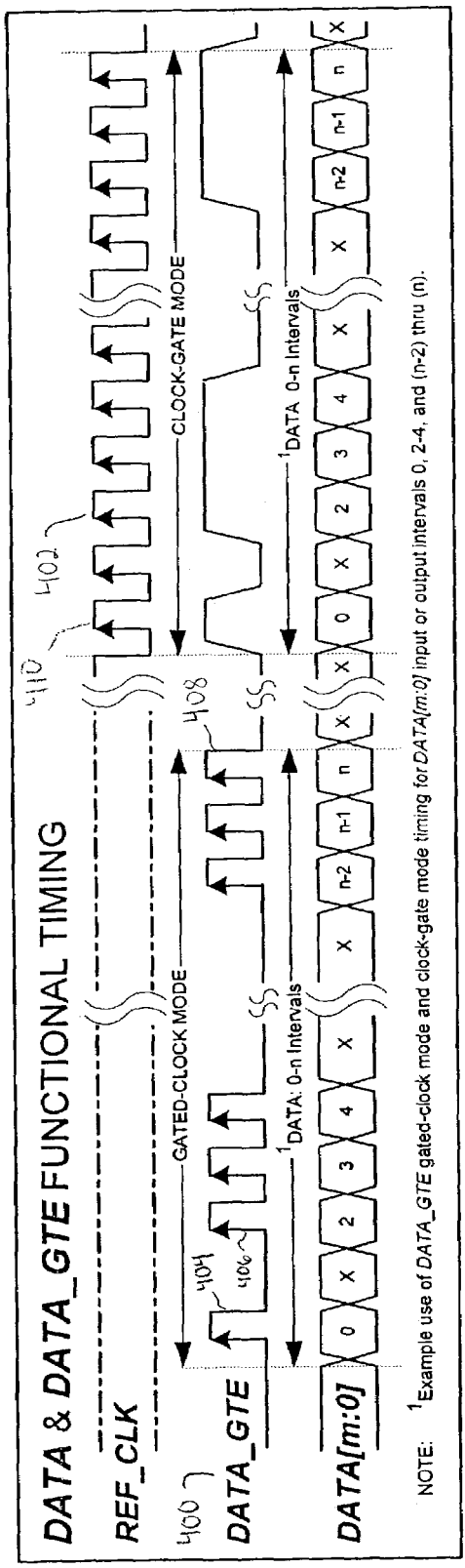
FIG. 4 is a timing diagram of a dual-function clock/enable signal relative to system data.

FIG. 4 is an example timing diagram that depicts the characteristics of a GTE signal 400 along with the timing of data transferred between a host device and a number of target devices. Depending upon the mode of operation, GTE signal 400 represents a gated-clock signal or a clock-gate signal. The left side of FIG. 4 represents operation in a gated-clock mode where a synchronous reference clock signal is unnecessary. The right side of FIG. 4 represents operation in a clock-gate mode where a synchronous reference clock signal 402 is utilized along with GTE signal 400.

Referring to the gated-clock mode of operation, GTE signal 400 is an asynchronous gated-clock signal having timing characteristics (e.g., the high time for each clock pulse, the time between adjacent clock pulses, and the like) related to a particular reference clock signal. The phase or period of this reference clock signal need not be related to synchronous reference clocks utilized by the system for other purposes. In this operating mode, GTE signal 400 is received and acted upon by one or more enabled asynchronous target devices. In this example, the data present on the common data bus is transferred (i.e., read or written) at each rising edge of the asynchronous GTE signal 400. The data set corresponding to index 0 is transferred in response to the rising edge of the first clock pulse 404. The data signal on the data bus is advanced to the next data set value on the falling edge of clock pulse 404. This data transference process repeats until the selected data has been processed. In this regard, the data set corresponding to index 2 is transferred in response to the rising edge of the next clock pulse 406, and the data set corresponding to index n is transferred in response to the rising edge of the last clock pulse 408. The data sets between clock pulses (identified by index value X) are ignored or neglected during the transference of non-contiguous data sets. For example, the selected target device may perform other functions during these inactive periods.

Referring to the clock-gate mode of operation, GTE signal 400 is a synchronous clock-gate signal having timing characteristics related to reference clock signal 402. As mentioned above, reference clock signal 402 can be utilized with any number of synchronous target devices connected via a common data bus and a common clock bus. In this operating mode, GTE signal 400 is received and acted upon by one or more enabled synchronous target devices. In this example, the data present on the common data bus is transferred (i.e., read or written) at each rising edge of reference clock signal 402, but only if the synchronous GTE signal 400 is also in an enable state. In the example embodiment, GTE signal 400 is enabling when high. As shown in FIG. 4, the data set corresponding to index 0 is transferred in response to the rising edge of the first reference clock pulse 410. The data signal on the data bus is advanced to the next data set value on the falling edge of reference clock pulse 410. When GTE signal 400 is low, the current data sets are ignored or neglected.

In a practical embodiment, the transition between operating modes is performed during periods of inactivity, e.g., when the gated-clock signal is between pulses or when the clock-gate signal is between enable states. Scheduling transitions in this manner reduces the likelihood of data transfer errors between the host device and the target devices. The host device is configured to switch between operating modes at specific times in conjunction with the enabling/disabling of target devices, while providing the GTE signal 400 on a common clock bus to the target devices. The different operating modes, and their corresponding GTE signal characteristics, may be switched under the control of the host device such that one operating mode immediately follows the preceding operating mode. In the example embodiment, the following operations may be performed: transferring data, via the common data bus, from the host device to one or more synchronous target devices; transferring data, via the common data bus, from the host device to one or more asynchronous target devices; transferring data, via the common data bus, from a synchronous target device to the host device; and transferring data, via the common data bus, from an asynchronous target device to the host device.

Figure 5:
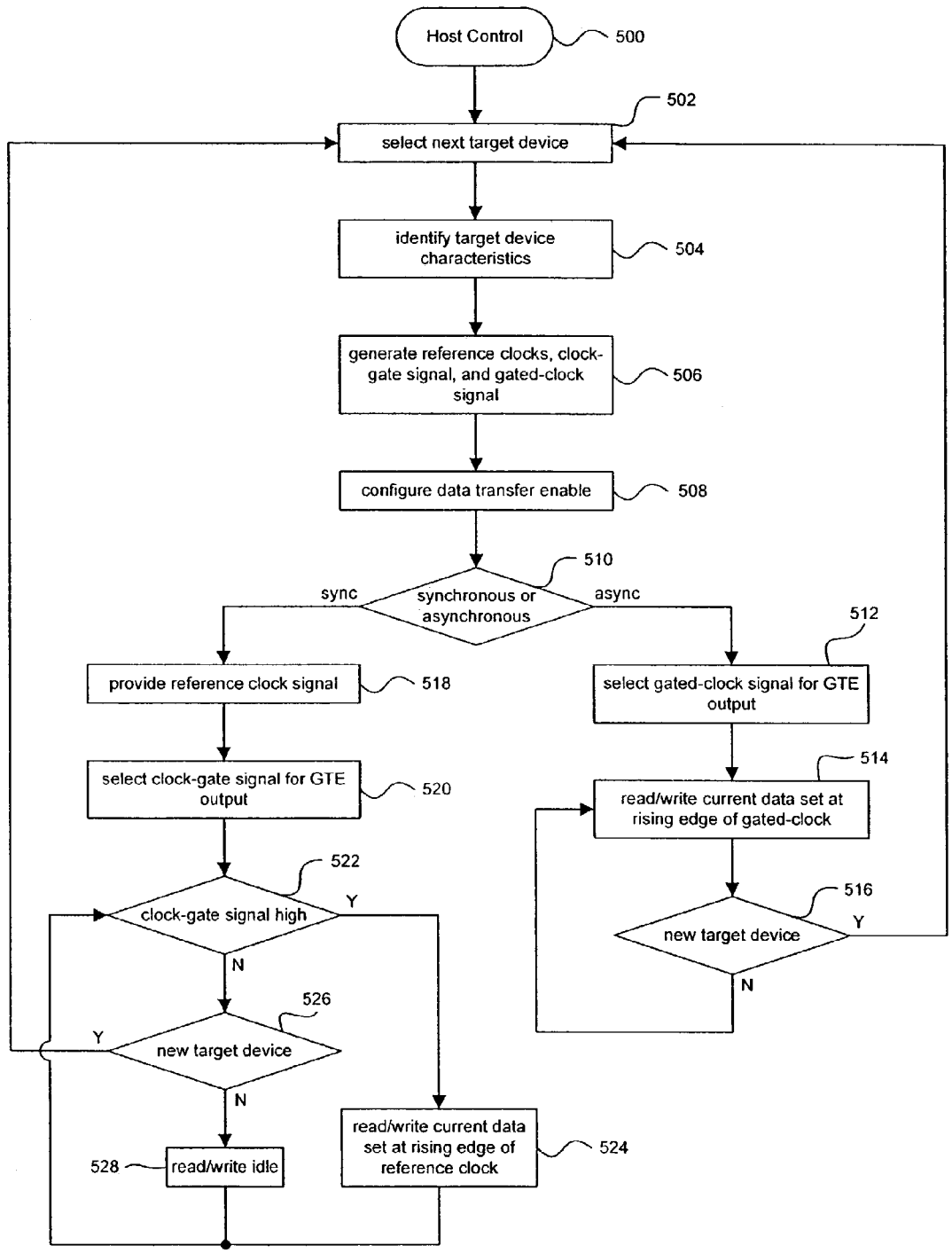
FIG. 5 is a flow diagram of a host control process.

FIG. 5 is a flow diagram of a host control process 500 that may be performed by a host device (as described above). Unless otherwise specified herein, process 500 may perform one or more of the illustrated tasks concurrently and, in a practical implementation, process 500 may include additional or alternative tasks. Furthermore, the order of the individual tasks in process 500 may vary in a practical application.

Process 500 assumes that the host device maintains stored information associated with the identity and operating parameters of the target devices to which it is connected. These parameters include, without limitation: whether a given target device is configured, to react to an asynchronous gated-clock signal or a synchronous clock-gate signal; the manner in which a given target device is enabled/disabled; whether the given target device has a serial data I/O or a parallel data I/O; physical size of read and/or write memory address range; and optimum target specific data exchange rate (gated-clock or clock-gate required signaling rate). Having access to this information allows the host device to maintain centralized control over data transfer operations between itself and the target devices.

Host control process 500 begins by selecting the next target device for purposes of a data transfer operation (task 502). In this example, the host device regulates the amount of data ingress and egress relative to itself by controlling data transfer with the currently selected target device. The host device may identify the operating characteristics of the selected target device (task 504), e.g., whether the selected target device is asynchronous or synchronous, the clock/timing speed of the selected target device, whether the selected target device is bidirectional or unidirectional, and the like. As mentioned above, these operating parameters may be stored at the host device for access during task 504. The host device may process the operating characteristics of the target device and, in response to such processing, generate reference signal(s), read/write control signal(s), a clock-gate signal, and/or a gated-clock signal (task 506).

Regarding task 506, the host device may employ any number of reference clock generators (see, the example embodiment shown in FIG. 3) to produce the reference clock signal utilized in the synchronous operating mode, and one or more reference clocks upon which the gated-clock signal is based. The host device and/or other components of the data communication system may utilize these reference clocks for other purposes, such as system/network time keeping and host-to-host or host-to-network data communications. The clock-gate signal or the gated-clock signal may be generated as needed under the control of the host device. Alternatively, the host device can actively maintain both of these signals as "background" signals.

The host device may also configure the data transfer enable (task 508) in a suitable manner such that the selected target device can be enabled and such that the unselected target devices remain disabled or inactive. In a practical embodiment, the host device may generate a logic high output on the enable output connected to the selected target device, and logic low outputs on all other enable outputs (or vice versa). In a broadcast operating mode, the host device may enable more than one target device to facilitate concurrent data transfer from the host device to the enabled target devices. In the asynchronous operating mode, the host device disables the synchronous target devices; in the synchronous operating mode, the host device disables the asynchronous target devices (this applies to both broadcast data transfers and point-to-point data transfers).

As mentioned above, the example embodiment is configured to support at least two general operating modes: an asynchronous operating mode that supports one or more asynchronous target devices; and a synchronous operating mode that supports one or more synchronous target devices. In practice, the host device operates in one of these modes at any given time. Query task 510 represents the mode switching capability of the host device. If the currently selected target device is an asynchronous device, then the host device enters an asynchronous data communication mode and query task 510 leads to a task 512. In the asynchronous operating mode, the host device selects the asynchronous gated-clock signal (task 512) and generates that signal onto the common clock bus that is shared by the target devices. As mentioned above, to ensure compatibility, the host device may generate the asynchronous gated-clock signal in response to the operating characteristics of the selected target device.

In response to the asynchronous gated-clock signal, the current data set (which may be a single bit or a plurality of parallel bits) is transferred between the host device and the selected target device (task 514). Notably, the common data bus is utilized to transfer the data between the host and target devices. In practice, the data transference operation can represent a read/write operation at the host device or a read/write operation at the target device. As depicted in FIG. 4, the example embodiment performs the read/write operation at the rising edge of the asynchronous gated-clock signal. The next data set is advanced with the falling edge of the gated-clock signal.

If the next data set corresponds to a different target device (query task 516), then host control process 500 can be re-entered at task 502 for selection of the next target device. If not, then process 500 can be re-entered at task 514 to enable further data transfer with the currently selected target device. As described above in connection with FIG. 4, task 514 is performed in response to the timing characteristics of the corresponding asynchronous gated-clock signal, which may have adjacent clock pulses and/or clock pulses separated by "inactive" periods during which data need not be transferred between the host device and the currently selected target device. In other words, the timing of data transfer between the host device and the currently selected target device is determined by the timing characteristics of the asynchronous gated-clock signal.

If, however, the currently selected target device is a synchronous device, then the host device enters a synchronous data communication mode and query task 510 leads to a task 518. In the synchronous operating mode, the host device provides the synchronous reference clock signal (task 518) at the reference clock output. Task 518 makes the reference clock signal available to the selected target device. As described above, the reference clock signal may be continuously provided by the host device to facilitate other synchronous functions of the data communication system. The host device also selects the synchronous clock-gate signal (task 520) and generates that signal onto the common clock bus that is shared by the target devices. As mentioned above, to ensure compatibility, the host device may generate the synchronous clock-gate signal in response to the operating characteristics of the selected target device.

If the clock-gate signal currently represents a data enable state (task 522), then data transference may be performed. In the example embodiment, the clock-gate signal represents a data enable state when high; conversely, when the clock-gate signal is low, data transference is not enabled. In response to the synchronous reference clock signal, which has a specified period and duty cycle, the current data set (which may be a single bit or a plurality of parallel bits) is transferred between the host device and the selected target device (task 524). Notably, the common data bus is utilized to transfer the data between the host and target device. In practice, the data transference operation can represent a read/write operation at the host device or a read/write operation at the target device. As depicted in FIG. 4, the example embodiment performs the read/write operation at the rising edge of the synchronous reference clock signal. The next data set is advanced with the falling edge of the synchronous reference clock signal.

If the synchronous clock-gate signal does not indicate a data enable state, then host control process 500 may perform a query task 526. If the next data set corresponds to a different target device (query task 526), then host control process 500 can be re-entered at task 502 for selection of the next target device. If not, then the host device may enter a read/write idle or disable mode (task 528) during which no data is transferred between the host device and the currently selected target device. Host control process 500 is re-entered at task 522 to monitor the read/write enable state of the synchronous clock-gate signal. As described above in connection with the synchronous operating mode shown in FIG. 4, task 524 is performed in response to the timing characteristics of the synchronous reference clock and in response to the read/write data enable state of the synchronous clock-gate signal. The clock-gate signal may define any number of enable periods separated by any number of "inactive" periods during which data need not be transferred between the host device and the currently selected target device.

For the sake of simplicity, host control process 500 does not include the optional broadcast data transfer mode during which a common data set is concurrently transferred from the host device to either a plurality of asynchronous target devices or a plurality of synchronous target devices. The general techniques and procedures set forth in process 500, however, can be modified or otherwise applied to accommodate such a broadcast mode. Briefly, in the asynchronous operating mode, the broadcast data set can be concurrently written by the plurality of asynchronous target devices at the rising edge of the gated-clock signal, and, in the synchronous operating mode, the broadcast data set can be concurrently written by the plurality of synchronous target devices at the rising edge of the synchronous reference clock signal (assuming that the synchronous clock-gate signal is in the enable state).

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A method for generating a clock signal by a host device that supports a plurality of target devices, said method comprising:
   generating, in a first operating mode, an asynchronous gated-clock signal onto a common clock bus shared by said plurality of target devices; and
   generating, in a second operating mode, a synchronous clock-gate signal onto said common clock bus.

2. A method according to claim 1, further comprising providing, in said second operating mode, a reference clock signal having a period that influences timing characteristics of said synchronous clock-gate signal.

3. A method according to claim 1, further comprising transferring, in said first operating mode and in response to said asynchronous gated-clock signal, a data set between said host device and an asynchronous target device.

4. A method according to claim 3, wherein transferring said data set is performed in response to a rising edge of said asynchronous gated-clock signal.

5. A method according to claim 1, further comprising transferring, in said second operating mode and in response to said synchronous clock-gate signal, a data set between said host device and a synchronous target device.

6. A method according to claim 5, wherein transferring said data set is performed in response to a rising edge of a reference clock signal.

7. A method according to claim 6, wherein transferring said data set is performed when said synchronous clock-gate signal represents a data enable state.

8. A method according to claim 1, further comprising:
   selecting a current target device from said plurality of target devices;
   enabling said current target device;
   if said current target device is an asynchronous target device, providing said asynchronous gated-clock signal to said current target device; and
   if said current target device is a synchronous target device, providing said synchronous clock-gate signal to said current target device.

9. A method of controlling data transfer between a host device and a plurality of target devices including one or more asynchronous target devices and one or more synchronous target devices, said host device and said plurality of target devices sharing a common data bus and a common clock bus, said method comprising:
   in a first operating mode,
      enabling at least one asynchronous target device to facilitate data transfer with said host device;
      said host device generating an asynchronous gated-clock signal onto said common clock bus; and
      transferring a data set between said host device and said at least one asynchronous target device in response to said asynchronous gated-clock signal; and in a second operating mode,
enabling at least one synchronous target device to facilitate data transfer with said host device;
said host device generating a synchronous clock-gate signal onto said common clock bus; and
transferring a data set between said host device and said at least one synchronous target device in response to said synchronous clock-gate signal.

10. A method according to claim 9, further comprising:
in said first operating mode, disabling said synchronous target devices; and
in said second operating mode, disabling said asynchronous target devices.

11. A method according to claim 9, wherein:
in said first operating mode, transferring said data set represents a host read operation or a host write operation; and
in said second operating mode, transferring said data set represents a host read operation or a host write operation.

12. A method according to claim 9, further comprising:
providing, in said second operating mode, a reference clock signal having a period that influences timing characteristics of said synchronous clock-gate signal.

13. A method according to claim 12, wherein, in said second operating mode, transferring said data set is responsive to a rising edge of said reference clock signal.

14. A method according to claim 13, wherein, in said second operating mode, transferring said data set is performed when said synchronous clock-gate signal represents a data enable state.

15. A method according to claim 9, wherein, in said first operating mode, transferring said data set is responsive to a rising edge of said asynchronous gated-clock signal.

16. A data communication apparatus comprising:
a common clock bus output;
a signal generator arrangement configured to produce a synchronous clock-gate signal and an asynchronous gated-clock signal;
a signal selector coupled to said signal generator arrangement and to said common clock bus output; and
a controller that governs selection of either said synchronous clock-gate signal or said asynchronous gated-clock signal for provision at said common clock bus output.

17. A data communication apparatus according to claim 16, further comprising a reference clock generator configured to produce a reference clock signal having a period that influences timing characteristics of said synchronous clock-gate signal.

18. A data communication apparatus according to claim 16, further comprising a common data bus output configured to facilitate data transfer between said apparatus and a plurality of target devices including one or more asynchronous target devices and one or more synchronous target devices.

19. A data communication apparatus according to claim 18, wherein:
said controller is further configured to control, in a first operating mode and in response to said asynchronous gated-clock signal, data transfer between said apparatus and an asynchronous target device; and
said controller is further configured to control, in a second operating mode and in response to said synchronous clock-gate signal, data transfer between said apparatus and a synchronous target device.

20. A data communication apparatus comprising:
a common clock bus;
means for generating, in a first operating mode, an asynchronous gated-clock signal onto said common clock bus for use by one or more asynchronous target devices; and
means for generating, in a second operating mode, a synchronous clock-gate signal onto said common clock bus for use by one or more synchronous target devices.

* * * * *